United States Patent [19]

Fukuda

[11] 4,112,708
[45] Sep. 12, 1978

[54] FLEXIBLE DRIVE CABLE
[75] Inventor: Mataharu Fukuda, Toyonaka, Japan
[73] Assignee: Nippon Cable Systems Inc., Takarazuka, Japan
[21] Appl. No.: 697,939
[22] Filed: Jun. 21, 1976
[51] Int. Cl.$^2$ .............................................. F16C 1/10
[52] U.S. Cl. ...................... 64/2 R; 64/1 V; 74/501 P; 74/501 R
[58] Field of Search ............................ 64/2 R, 3, 1 V; 156/143; 74/501 R, 501 P

[56] References Cited

U.S. PATENT DOCUMENTS

| | | | |
|---|---|---|---|
| 179,747 | 7/1876 | Ward | 64/2 R |
| 1,678,335 | 7/1928 | Gaston | 64/2 R |
| 1,812,510 | 6/1931 | Berge | 64/2 R |
| 3,481,156 | 12/1969 | De Csipkes | 64/2 R |
| 3,581,523 | 6/1971 | Bartholomew | 64/2 R |
| 3,584,473 | 6/1971 | MacDonald | 64/3 |
| 3,791,898 | 2/1974 | Remi | 156/143 |

Primary Examiner—Benjamin W. Wyche
Assistant Examiner—R. C. Turner
Attorney, Agent, or Firm—Armstrong, Nikaido, Marmelstein & Kubovcik

[57] ABSTRACT

A flexible drive cable for use in motor vehicles, comprising an elongated torque-transmitting core member; an elongated tubular liner member, make of plastic material, defining an internal passage adapted to receive and movably support the core member; and an elongated tubular outer member for holding therein the liner member; at least one caved portion or cavity being disposed between the exterior of the liner member and the interior of the outer member. The caved portion or cavity can sufficiently prevent the noise which is produced upon engagement of the rotating core member against the interior face of the liner member, from being propagated outside through the outer member, and thereby can provide a flexible drive cable which exhibits a minimum amount of noise upon operation.

20 Claims, 14 Drawing Figures

FLEXIBLE DRIVE CABLE

BACKGROUND OF THE INVENTION

The present invention relates to a novel and improved flexible drive cable, and more particularly to a flexible drive cable in use for transmitting power with a rotary motion in motor vehicles.

Flexible drive cables have been used in a variety of applications where it is desirable to transmit rotary motion or torque to speedometers, tachometers, and the like, remote from the wheel section in motor vehicles.

Flexible drive cables of such a type need to sufficiently fulfill the requirement of silence upon operation thereof in order to meet the demand in the recent years of requesting a silent motorcar, in addition to another essential requirements such as of strength and durability to drive speedometers for a long period of time as well as of suitable flexibility so as to connect the speedometers with the wheel section (generally not axially aligned) therethrough.

Upon operation of the flexible drive cable, it has been observed that the severe oscillation of the core member arises often due to unavoidable uneven torque distribution therealong, which oscillation causes the core member to indiscriminately impinge against the interior face of the liner member, and thereby produces a noise. The noise thus produced is propagated outside through the outer member. The oscillation is also transferred to the dash-board or the like in motorcars through the outer member to result in causing a resonance therewith and thereby amplyfied, which is extremely undesirable for the drivers. The silence upon operation of the flexible drive cable is now-a-days one of the most important requirements to be fulfilled, and moreover the silence should be maintained and ensured for a long period of time.

In order to reduce the aforesaid noise and oscillation, many proposals have been made heretofore.

For example, U.S. Pat. No. 3,581,523, issued June 1, 1971 to D. D. Bartholomew, disclosed the construction to minimize the operational noise without employing lubricant, in which the liner member comprises an annular support section and a plurality of longitudinally extending resilient deformable ribs which are circumferentially spaced and adopted to resist radial movement of the core member upon rotation thereof.

U.S. Pat. No. 3,481,156 issued Dec. 2, 1969 to V. R. De Csipkes was also proposed. Although this invention is directed toward the flexible drive cable provided with longitudinal grooves which permit assembly of the cable by insertion of the core member into the passage of the liner member so that the corners of squared end of the core shaft pass through the passage via the grooves, mentions that the close radial clearance between the core member and the liner member is quite useful to abate the operational noise level. Nevertheless, these efforts which have been devoted to reduce the operational noise or oscillations, none of flexible drive cables hitherto known can fully fulfill aforesaid requirements. The inventor of this invention found that it should be provided with further three provisions or means below described to obtain a satisfied flexible drive cable.

First; a suitable soundproofing means to preclude the noise or oscillation produced upon engagement of a rotating core member against the inner face of the liner member from being transferred to the outer member and being propagated outside through the outer member.

Second; a means for well lubricating the interior of the liner member through the whole length thereof and for eliminating the abrasion to perform a silent operation for a long period of time. For that purpose, it should be noted that the flexible drive cable usually employs some types of liner member to guide and constrain an internally mounted rotatable shaft or core member which comprises generally more than two coils closely wound one on the other in alternately opposite directions. For such a construction stated above, a screw of a kind, i.e. coil-screw is fabricated at the exterior of the outermost coil with each wire wrapped therein. Therefore, in rotation of the core member, a lubricant which is essential to abate the abrasion of the liner member and filled between the core member and the liner member, is transferred in one direction along the passage of the liner member owing to the screw effect of the coil-screw, and the lubricant comes to show uneven distribution in volume along the passage.

The uneven distribution does not make good use of lubricant, and also it tends to wear the interior face of the liner member to result in increase of operational noise and shortening the life thereof.

Therefore, it is quite essential to preclude the transfer of the lubricant, and besides, it is to be noted that it is aggravated in accordance with the increase of the revolutional speed thereof.

Third; the means for reducing the operational noise per se is also to be provided to satisfy the aforesaid requirements.

The flexible drive cable in which the above three means are provided has never been obtained.

As for the second problem concerning the transfer of the lubricant, aforesaid U.S. Pat. No. 3,481,156 and U.S. Pat. No. 3,922,882 teach the usage of the liner member which has an inner face formed with longitudinal grooves or corner portions for residence of a lubricant to well lubricate the core member.

It is conceded that these structures have effect to lubrication of the core member, but it has been ascertained by the present inventor of the invention that the aforesaid transfer of lubricant can not be prevented sufficiently by structures stated in the aforesaid U.S. Patents.

OBJECTS OF THE INVENTION

It ia an object of the present invention to provide a novel and improved flexible drive cable, especially for use in motor vehicles to transmit power of rotary motion or torque to speedometers, or the like.

Another object of the invention is to provide a flexible drive cable which is capable of precluding the noise and oscillation produced between the inner face of the liner member and the core member from being transferred to the outer member and from being propagated outside through the outer member.

Further object of the invention is to provide a flexible drive cable which can prevent the transfer of a lubricant in the passage of the liner member, which arises with the rotation of the core member having a screw of a kind or coil-screw therearound.

Morefurther object of the invention is to provide a flexible drive cable which can reduce the operational noise and oscillation per se.

Another objects and advantages of the invention will become apparent from the following description of the embodiments with reference to the accompanying drawings.

DETAILED DESCRIPTION

It has found that these objects can be achieved on the basis of the flexible drive cable consisting of an elongated torque-transmitting core member; an elongated tubular liner member made of plastic material defining an internal passage adapted to receive and movably support the core member; and an elongated tubular outer member for holding therein the liner member; at least one caved portion or cavity being disposed between the exterior of the liner member and the interior of the outer member.

Figure 1:
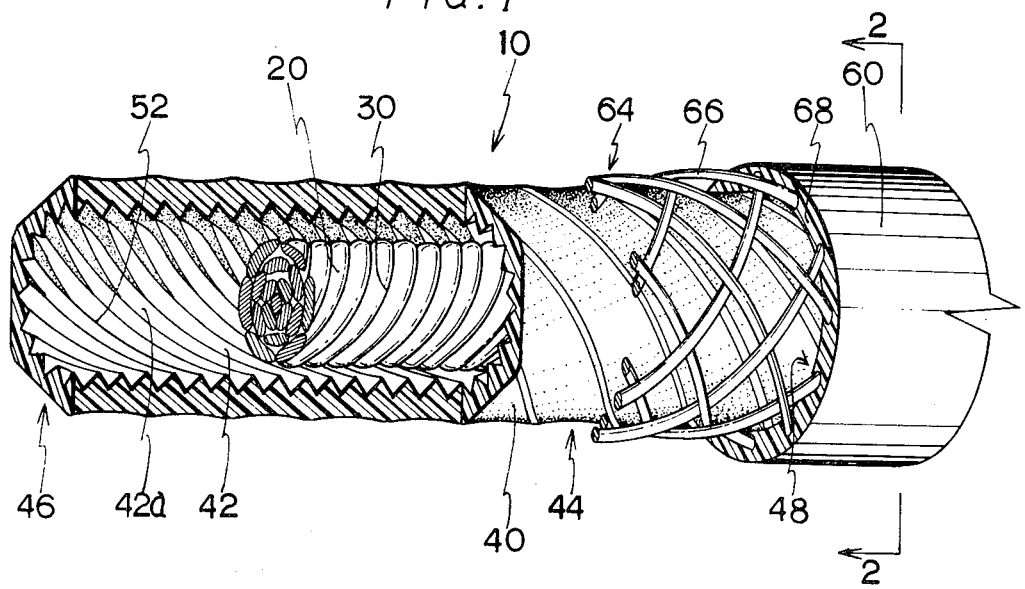
FIG. 1 is a fragmentary cross-sectional perspective view, showing an embodiment of the present invention, partially broken away to set forth the construction thereof in detail.
Figure 2:
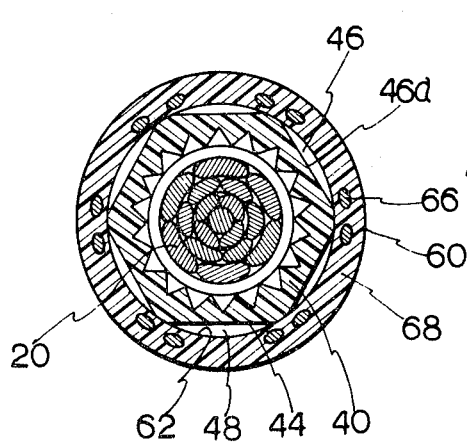
FIG. 2 is a transverse cross-sectional view taken substantially along the line 2—2 of FIG. 1.

Referring now to drawings, there is shown in FIGS. 1 and 2, a flexible drive cable 10 comprising a flexible shaft or elongated torque-transmitting core member 20, an elongated tubular liner member 40 defining an internal passage 42 adapted to receive and movably support the core member 20 and an elongated tubular outer member 60 for holding therein the liner member 40. The space between the core member 20 and the liner member 40 is filled with a lubricant such as grease (not shown).

The liner member 40 is suitably made of plastic material such as polyamide, polyacetal, polyallylate, polyester, polyethylene, polyfluorocarbon, hydrolyzed ethylene-vinyl acetate copolymer, acrylonitrile-butadiene-styrene copolymer, acrylontrile-styrene-copolymer, polypropylene or a similar material, which is resistnt to deterioration and readily adapted for conventional molding or extruding techniques. Especially, excellent results are obtained with liner member 40 made of graphite-containing plastic materials which are rather of less friction resistance.

Referring now in detail to the structure of an external periphery 44 of the liner member 40, the outer periphery 44 of the liner member 40 is formed with a plurality of depressed portions 46 which are running the whole length of the liner member 40 from one end to the other and are disposed in spiral about the axis thereof, the depressed portions 46 forming caved portions or cavities 48 (best shown in FIG. 2) between the outer face 44 of the liner member 40 and the inner face 62 of the outer member 60.

The depressed portions 46 are also preferably spaced with approximately circular pitch therearound.

The number of depressed portions 46 may vary somewhat in accordance with necessary conditions.

Instead of the arrangement wherein the depressed portions 46 are formed spirally about the axis of the liner member, the portions 46 may be formed longitudinally parallel to the axis thereof, as shown in FIGS. 5 to 8.

Moreover, it is apparent, of course, that the cross sectional shape of the depressed portions 46 may be varible as will be shown later, differing from the cross sectional shape of this embodiment which is formed by cutting out a circle by a straight line 46a. And also, the depressed portions 46 may be formed in the inner surface 62 of the outer member 60 in the necessary case.

With the caved portions 48 disposed between the outer periphery 44 of the liner member 40 and the inner periphery 62 of the outer member 60, operational noise or oscillation produced by engagement of the core member 20 against the inner surface 42a of the liner member 40 can be effectively prevented from being transferred to the outer member and being propagated outside through the outer member, as will be evident by those skilled in the art, and therefore the flexible drive cable exhibits a minimum amount of noise or oscillation.

Referring now in detail to the means or configuration of the internal periphery 42a of the liner member 40.

Figure 12:
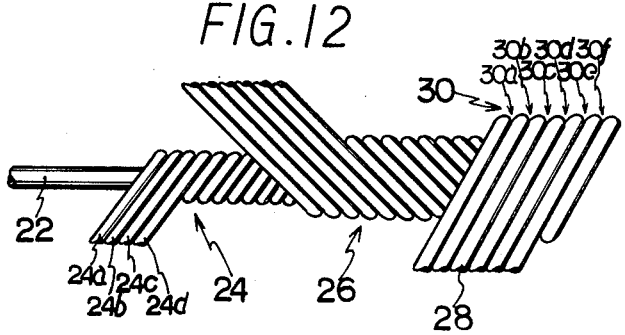
FIGS. 12 and 13 are plan views, partially unwrapped, showing the constructions of the core member.

In order to fully appreciate the configuration of the present invention, it should be understood that the core member or flexible shaft 20, as best shown in FIG. 12, comprises a plurality of coils of closely wrapped wire; the first coil or layer 24, comprising wires 24a to 24d, being wrapped on a central mandrel core 22, and then second and third layers, 26 and 28, and any additional layers are wrapped on one another in alternately opposite helical directions to an expected diameter, to achieve smooth operation and to provide a design being capable of transmitting torque in either direction of rotation.

Figure 11:
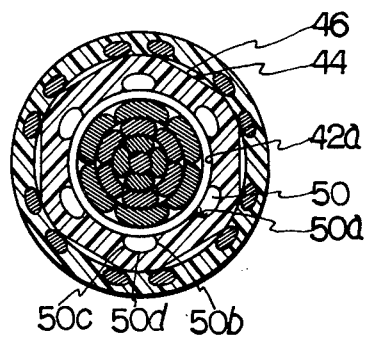
FIG. 11 is a fragmentary cross-sectional view showing an embodiment of the sheath member.

As a result of this construction of the flexible core member 20, a screw of a kind (hereinafter referred to as "coil-screw 30") with six strands 30a to 30f in case of FIG. 11, is formed around the outer periphery of the outest layer 28.

Figure 13:
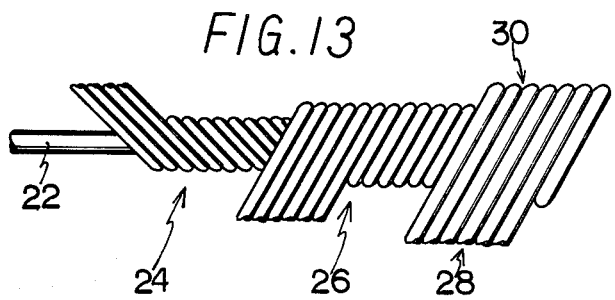

It is apparent that the core member 20 may be of various other constructions or configurations in which the number of layers and the wires in a layer are changeable in accordance with the driving conditions and also the outest layer 28 and the layer 26 adjacent to the layer 28 may be both wrapped advantageously in the same helical direction, as shown in FIG. 13, in order to increase the capacity of transmitting power of rotary motion or torque in case where the cable 10 is employed in single direction of rotation. However, the core member 20 also may comprise only a single round mandrel wire only in the specified successful case.

The inner periphery 42a of the liner member 40 is formed with a plurality of lubricant-grooves 50 of trianglar cross section which is running the whole length of liner member 40 from one end to another end and is preferably spaced with about equal circular pitch therearound. And also the lubricant-groove 50 is spiralled in the same direction as that of the coil-screw 30 (best shown in FIGS. 12 and 13) formed around the outer periphery of the core member 20. That is, the lubricant-groove 50 should be formed in such a left hand screw hole, when the coil-screw 30 is fabricated in a form of left hand screw.

Figure 14:
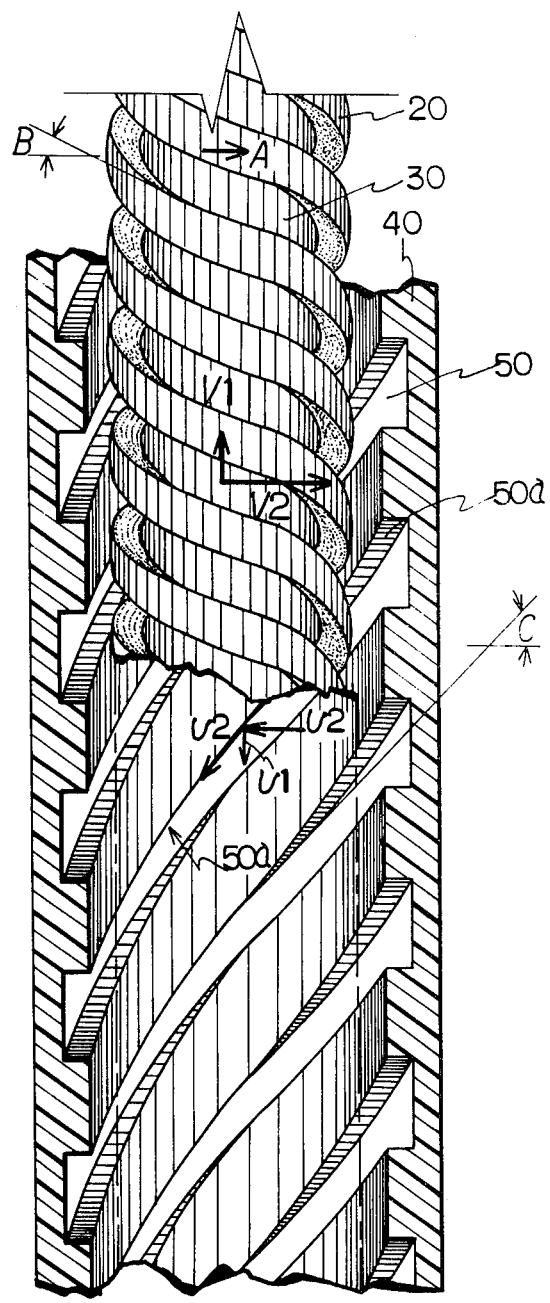
FIG. 14 is an enlarged fragmentary longitudinal-sectional view, partially broken away, explaining the transfer of the lubricant along the passage of the liner member.

Referring now to FIG. 14, the function of the lubricant-groove 50 spirally disposed about the axis of the liner member 40 will be explained. In FIG. 14, the aforesaid triangular lubricant-groove 50 and the coil-screw 30 are both changed to such a shape of rectangular thread and thread hole to simplify the drawing and explanation. With the rotation of the core member 20 in the direction shown by the arrow A drived by the wheel section (not shown but positioned downside and the core member 20 generally should be advantageously rotated in the direction wherein the outermost layer 28 is further torsioned), the lubricant adjacent to the coil-screw 30 is not only moved upward in the velocity V1 owing to the screw effect of the coil-screw 30, but also is rotated circularly in some velocity nearly equal to that of the rotational speed V2 of the core member 20, and thereby the lubricant in the lubricant-groove 50 is also conveyed circularly in certain velocity $v2$ (shown in the backside of the core member 20) which may be smaller than V2 and is moved along the sidewall 50a of the lubricant-groove 50 in the same speed $v2$. With the lubricant-groove 50 being spiralled about the axis thereof in the same direction as that of the coil-screw 30, the lubricant is moved downward in the velocity $v1$. Additionally, when the core member 20 is rotated in higher speed, the lubricant adjacent to the core member 20 is circumferentially spattered as the matter of course and is forced into the lubricant-groove 50 to result in higher downward transfer of the lubricant along the lubricant-groove 50.

With the structure stated above, the lubricant is circulated and resupplied to the core member 20 at any positions of the passage 42 of the liner member 40 and is distributed evenly therethrough, and thereby the liner member 40 is always given sufficient lubricant through the whole length thereof. Therefore, the flexible core member 20 always rotates smoothly without wearing the inner surface 42a of the liner member 40 and is operable for a long period of time with minimizimg the operational noise without causing any accident such as break-down of the flexible drive cable 10, even when the contact area 52 is rather small as viewed in this embodiment.

Further, as for the spiral angle of the lubricant-groove 50, it should be determined in accordance with the conditions such as the cross sectional shape thereof, the characteristics of the lubricant, the rotational speed of the core member 20 and spiral angle of the coil-screw 30. Generaly speaking, it is advantageous to make the spiral angle C of the lubricant-groove 50 (shown in FIG. 14) smaller than that of the spiral angle B of the coil-screw 30.

It should be noted that, although the aforesaid U.S. Pat. No. 3,481,156 mentions the liner member formed with grooves which are spirally disposed about the axis thereof, it neither makes any suggestion with respect to the above-described transfer of the lubricant, nor makes any suggestion, not to mention, to this important spiral direction of the lubricant-groove 50. From the foregoing, it is quite apparent that the transfer of the lubricant is severely aggravated, if the lubricant-groove 50 is spiralled in wrong direction.

With the inner face 42 formed with triangle lubricant-grooves 50 defining longitudinal rather small top area 52 radially inwardly projected with which the core member 20 comes in contact, the top area 52 being deformable resiliently upon engagement of the rotating core member 20 therewith, the oscillation of the core member 20 is sufficiently absorbed in localized area therealong absorbing any noise produced upon operation.

The depressed portions 46 which make the liner member 40 further deformable is also effective to promote this absorbing function.

It is well known that the close sliding clearance between the inner surface of the liner member 40 and the core member 20 is useful to reduce the operational noise level, and such an arrangement is also available in this embodiment in necessary case. Thus the operational noise per se can be reduced remarkably.

Figure 9:
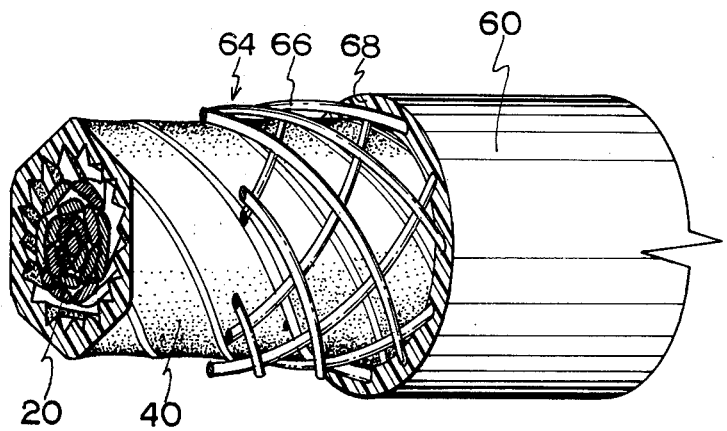

Referring now in detail to the construction of the outer member 60, the outer member 60 consists of a sheath member 64 comprising twelve helically wound and braided reinforcing wires 66, with six wires being wound in one spiral direction and another wires being wound in the opposite direction, and a tubular member 68 made of plastic material formed integrally with reinforcing wires 66 for fixing and preservation. The reinforcing wires 66 are employed in order to reduce the elongation and shrinkage of the plastic tubular member 68 against the temperature change to avoid disconnecting the core member 20 from wheel section or speedometers. Besides, these wires 66 are effective in order to prevent the cable from being bent extremely or in small radius for protecting the core member 20 against fatigue-shearing and for avoiding the increase of friction resistance upon operation. The number of wires 66 employed or wire density in a layer, of course, may vary depending upon the strength required to the outer member 60. Additionally, the wires which are not braided, as shown in FIG. 9, are also available in necessary case.

Optionally, whole outer member 60 can be made of suitable plastic material such as graphite- or glass fiber-containing plastic material.

Figure 4:
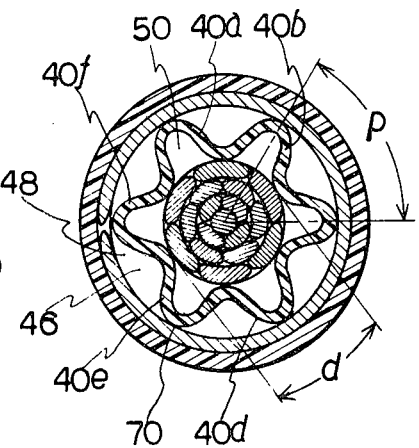
FIG. 4 is a transverse cross-sectional view taken substantially along the line 4—4 of FIG. 3.
Figure 3:
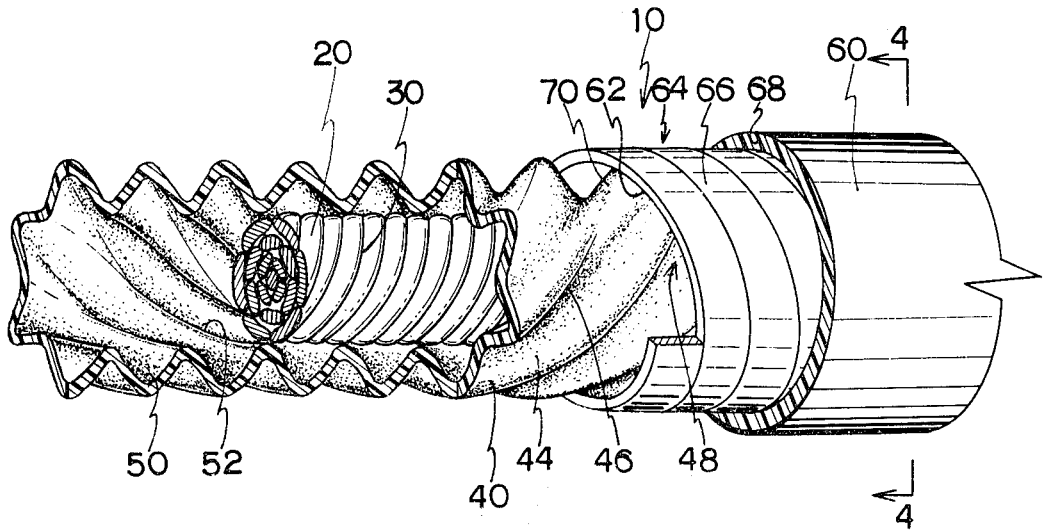
FIG. 3 is a view similar to FIG. 1, showing another embodiment of the present invention.

Referring now to FIGS. 3 and 4, there is shown an another embodiment of the present invention. In this embodiment, the liner member 40 has a star-shaped cross-section constructed by some ring-portions 40a to 40f having a single-wave-shaped cross-section and uniform cross-section in thichness, respectively, as shown in FIG. 4. Therefore, the inner periphery 42 of the liner member 40 is formed with a plurality of lubricant-grooves 50 having wave-shaped cross-sections which are extending along the whole length thereof and are preferably spaced with approximately circular pitch or pitch angle $p$ therearound.

Further, the lubricant-groove 50 is also spiralled in the same direction as that of the aforesaid coil-screw 30 (shown in FIGS. 12 and 13) formed around the outer periphery of the core member 20, in the same manner as described in the embodiment shown in FIGS. 1 and 2. Similarly, the outer periphery 44 of the liner member is formed with a plurality of depressed portions 46 which are running the whole length of the liner member 40 from one end to the other and are spaced with aforesaid pitch angle $p$.

The depressed portions 46 are spiralled in the same direction and in the same helical angle with respect to the lubricant-groove 50, for the convenience in manufacturing thereof.

The minimum diameter $d$ of the passage 42 for holding therein the core member 20 is formed in such a dimension wherein the core member 20 is in sliding contact therewith slightly resiliently.

It is apparent, of course, that the minimum diameter $d$ of the passage 42 may be also determined in such a dimension wherein a small radial clearance is formed between the core member 20 and the liner member 40.

With the construction stated above, the flexible drive cable of this embodiment can exhibit the following superiorities, in which:

Firstly, the noise produced is effectively prevented from being propagated outside through the outer member owing to the cavities 48 formed by the depressed portions 46 between the outer face 44 of the liner member 40 and the inner face 62 of the outer member 60. And also the operational oscillation is also precluded from being transferred to the outer member 60 sufficiently.

Especially, since the exterior 44 of the liner member 40 is touching with the inner surface 62 of the outer member 60 only at the quite small portions 70 disposed between the neighbouring two wave-shaped depressed portions 46 and therefore the air pockets or cavities 48 are comparatively large, the operational noise or oscillation is effectivly isolated.

Secondly, since the core member 20 contacts only with the liner member 40 at the small area 52 and further it contacts therewith slightly resiliently, the noise is remarkably reduced. Besides, the inner surface 42 of the liner member 40 is of a resilient deformable construction owing to aforesaid wave-shaped lubricant-groove 50 and depressed portions 46, and thereby it is thus designed to deform readily upon engagement of the rotating core member 20. The deformation of the liner member 40 is capable of functioning effectively to absorb the operating oscillation and thereby functions to reduce the noise.

Thirdly, a uniform distribution of lubricant along the whole length of the liner member 40 is attained owing to the lubricant-grooves 50 spiralled in the aforesaid direction, which can provide a flexible drive cable being capable of operating for a long period of time without any trouble such as break-down thereof.

The outer member of this embodiment, as shown in FIGS. 3 and 4, comprises a sheath member 64 formed by closely wrapped wire 66 having an approximately rectangular cross-section and a plastic tubular member 68 for holding therein the sheath member 64 to obtain water-proofing and preservation.

Figure 5:
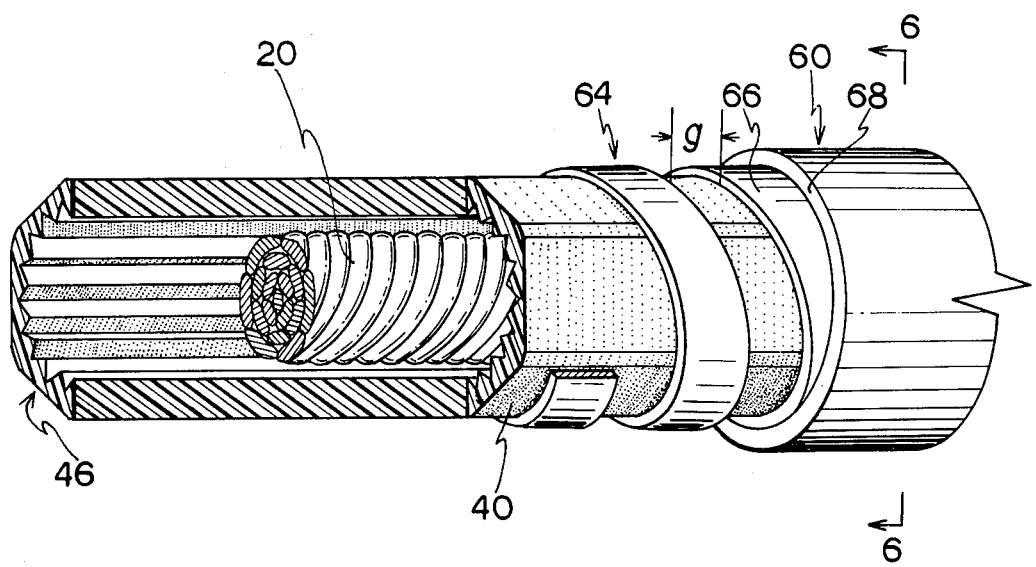
FIG. 5 is a view similar to FIG. 1, showing another embodiment of the present invention.
Figure 6:
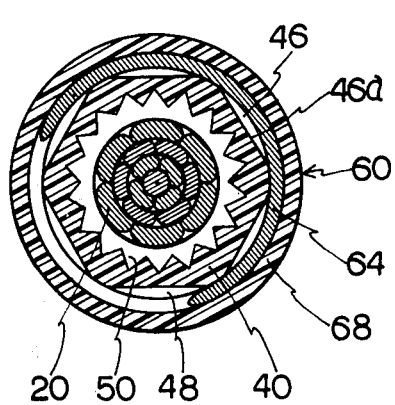
FIG. 6 is a transverse cross-sectional view taken substantially along the line 6—6 of the FIG. 5.

FIGS. 5 and 6, show another embodiment of the present invention.

The liner member 40 of this embodiment is formed with a plurality of depressed portions 46 and lubricant-grooves 50 which are of the same cross-section as those shown in FIGS. 1 and 2, respectively, and are both extending longitudinally parallel to the axis thereof, differing from those in the embodiment of FIGS. 1 and 2 which are both disposed in spiral about the longitudinal axis thereof. The flexible cable 10 of the present invention is available wherever the transfer of the lubricant is negligible, for example, in case the revolutional speed is rather low or the outer periphery of the core member 20 is smooth and round (not shown) without having any such aforesaid coil-screw 30.

The outer member 60 of the present invention, as best shown in FIG. 5, comprises a sheath member 64 formed by wire 66 having an approximately rectangular cross-section, the wire 66 being wrapped spacing gap $g$ between adjacent two wraps, and a tubular member 68 made of plastic material for holding therein the sheath member 64 to obtain water-proofing and preservation.

With the arrangement of the outer member 60, it can provide a flexible drive cable which is bendable without elongation or shrinkage in length.

Figure 8:
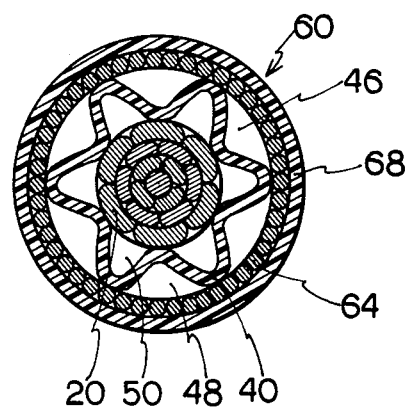
FIG. 8 is a transverse cross-sectional view taken substantially along the line 8—8 of FIG. 7, FIGS. 9 and 10 are cross-sectional views, showing another embodiments of the present invention.
Figure 7:
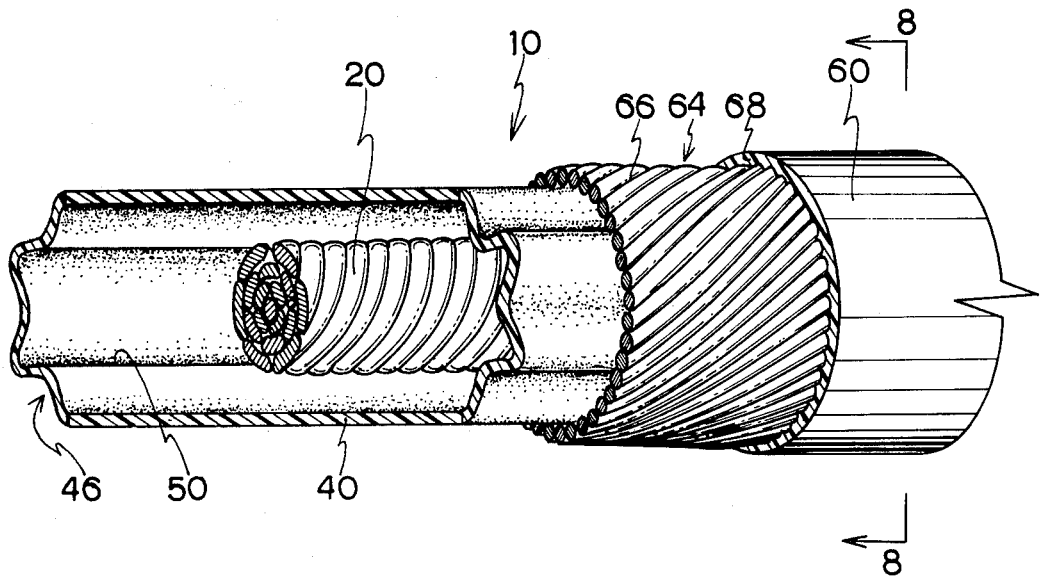
FIG. 7 is a view similar to FIG. 1, showing furthermore embodiment of the present invention.

As for the embodiment shown FIGS. 7 and 8, the cross-sectional figure of the liner member 40 is the same as that shown in FIGS. 3 and 4. The liner member 40 of this embodiment is formed with depressed portions 46 and lubricant-grooves 50 which are both extending longitudinally parallel to the axis thereof, differing from those disposed in spiral about the longitudinal axis of the assembly shown in FIGS. 3 and 4. The flexible drive cable 10 is available in cases and purposes similar to the embodiment shown in FIGS. 5 and 6.

The outer member 60 of this embodiment, as best shown in FIG. 7, comprises a sheath member 64 formed by a plurality of round wires wrapped closely with rather long helical pitch and a tubular member 68 made of plastic material for holding therein the sheath member 64 to obtain water-proofing and preservation.

With the arrangement of the outer member 60, a flexible drive cable 10 of the present invention has appropriate rigidness and can bend without elongation or shrinkage in length.

Figure 10:
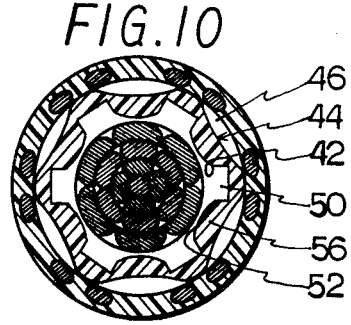

FIG. 10 shows an another embodiment of the invention.

The outer periphery 44 of the liner member 40 of this embodiment is formed with depressed portions 46 having wave-shaped cross-sections which are extending along the whole length thereof and are preferably spaced with approximately equal circular pitch.

The inner periphery 42 of the liner member 40 is formed with lubricant-grooves 50 of approximately rectangular cross-section, the corners of which being made round. The grooves 50 are extending along the whole length thereof and preferably circumferentially spaced therearound.

Besides, curved portions 56 slightly projecting inwardly are formed between the neighboring two lubricant-grooves 50. Since the core member 20 is in contact only with the top area 52 of the curved portions 56 upon rotation, in other words the area of frictional surfaces in engagement being rather small, the noise abatement is obtained as described in the embodiment shown in FIGS. 1 to 4.

The depressed portions 46 and/or lubricant-grooves 50 in this embodiment, may be either disposed longitudinally parallel to the axis thereof, or advantageously may be also spiralled in the aforesaid direction in order to prevent the lubricant from being moved along the passage of the liner member 40.

FIG. 11 shows another embodiment of the invention. The outer periphery 44 of the liner member 40 of this embodiment is formed with depressed portions 46 which are of the same cross-sections as those of shown in FIGS. 1 and 2. The inner face 42a of the liner member 40 is formed with lubricant-grooves 50 having such a figure in cross-section which comprises two opposing arc lines 50b, 50c and a straight line 50d connected smoothly to each end thereof, without employing sharp edges or corners. The lubricant-grooves 50 may be also formed of approximately circular in cross-section comprising a plurality of arcs or single arc. Besides, the lubricant-grooves 50 of this embodiment should be spiralled in the same direction as that of the coil-screw 30 (shown in FIGS. 12 and 13), as already shown in FIGS. 1 to 4. With the arrangement of the lubricant-groove 50, the lubricant can be flowed and rotated along the sidewall 50a of the groove 50, and thereby the lubricant is turned back and resupplyed to the rotating core member 20 fluently.

From the foregoing, saying in addition, it is apparent that the present invention is particularly directed toward a new and improved flexible drive cable which is designed to prevent the noise or oscillation produced upon operation from being conveyed to the outer member 60 by means of the cavities 48.

The present invention discloses additional ways to provide a flexible cable, wherein the operating noise or oscillation per se are extremely reduced. In addition to the ways of reducing the area of frictional surface in engagement and resiliently making the contact area deformable, aforesaid depressed portions 46 are effective to make the liner member deformable and abate the noise and oscillation per se. The suitable radial clearance or resilient contact between the liner member 40 and the core member 60 is also useful therefor.

Furthermore, the present invention discloses another additional way to provide a flexible cable which is capable of preventing the lubricant from being moved along the passage of the liner member, and thereby capable of operating with less friction-resistant rotation of the core member, without abrasing the inner face of the liner member for a long period of time. It is also apparent that the flexible cable of the present invention in which all of these ways are adopted is operable with less noise for a long period of time.

As many apparently widely different embodiments of the present invention may be made without departing from the spirit and scope thereof, it is to be understood that the invention is not limited to the specific embodiments thereof except as defined in the appended claims.

What we claim is:

1. A flexible drive cable which comprises:
an elongated torque-transmitting core member;
an elongated tubular liner member made of plastic material defining an internal passage adapted to receive and rotatably support said core member;
an elongated tubular outer member for holding therein said liner member; and
at least one caved portion being disposed between the exterior of said liner member and the interior of said outer member.

2. The flexible drive cable of claim 1, wherein said caved portion is formed by a depressed portion disposed around the outer periphery of said liner member.

3. The flexible drive cable of claim 2, wherein said depressed portion extends longitudinally parallel to the axis of said liner member.

4. The flexible drive cable of claim 2, said depressed portions are spaced with an approximately equal circular pitch around the outer periphery of said liner member.

5. The flexible drive cable of claim 2, said depressed portion is wave-shaped in cross-section.

6. The flexible drive cable of claim 5, a plurality of said depressed portions having the waved-shaped cross-section are formed successively around the outer periphery of said liner member, the depressed portions being spaced with an approximately equal circular pitch and being connected smoothly.

7. The flexible drive cable of claim 2, said depressed portion is in such a cross-sectional shape formed by cutting out a circle by straight or curved line.

8. The flexible drive cable of claim 1, wherein said core member comprises one or more coils of closely wrapped wire.

9. The flexible drive cable of claim 8, wherein a plurality of said coils are wrapped one on the other in alternately opposite directions, the outermost coil being formed with a coil-screw around the outer periphery thereof.

10. The flexible drive cable of claim 8, wherein the outermost coil and the coil adjacent to said outermost coil are wrapped in the same helical direction, the outest coil being formed with a coil-screw around the outer periphery thereof.

11. The flexible drive cable of claim 1, wherein said liner member has an internal passage formed with at least one lubricant-groove.

12. The flexible drive cable as claimed in claim 11, said lubricant-groove is of an approximately wave-shaped cross-section.

13. The flexible drive cable of claim 12, a plurality of said lubricant-grooves having the wave-shaped cross-section are formed successively around the inner periphery of said liner member, said grooves being spaced with an approximately equal circular pitch.

14. The flexible drive cable of claim 11, wherein said internal passage has an inner periphery formed with a plurality of lubricant-grooves and a plurality of curved portions which are formed between the neighboring two lubricant grooves and are defining contact areas extending radially and inwardly.

15. The flexible drive cable of claim 11, said lubricant-groove extends longitudinally parallel to the axis of said liner member.

16. The flexible drive cable of claim 1, wherein said liner member is made of at least one member selected from the group consisting of polyamide, polyacetal, polyallylate, polyester, polypropylene, polyfluorocarbon, polyethylene, hydrolyzed ethylene-vinyl acetate copolymer, acrylonitrile-butadiene-styrene copolymer and acrylonitrile-styrene copolymer.

17. The flexible drive cable of claim 1, said outer member comprises a sheath member formed by reinforcing wound wires and a plastic tubular member supporting therein said sheath member.

18. The flexible drive cable of claim 17, wherein said sheath member comprises a series of wires of round cross-section wrapped closely with rather long helical pitch around the axis thereof.

19. The flexible drive cable of claim 1, wherein said whole outer member is made of plastic material.

20. The flexible drive shaft of claim 19, said outer member is made of glass-fiber-containing plastic material.

* * * * *